Nov. 24, 1953  H. E. MORTON  2,660,096
PORTABLE MILLING MACHINE
Filed Nov. 16, 1948  7 Sheets-Sheet 1

Inventor
Henry Earl Morton
By Barthel + Bugbee
Attorneys

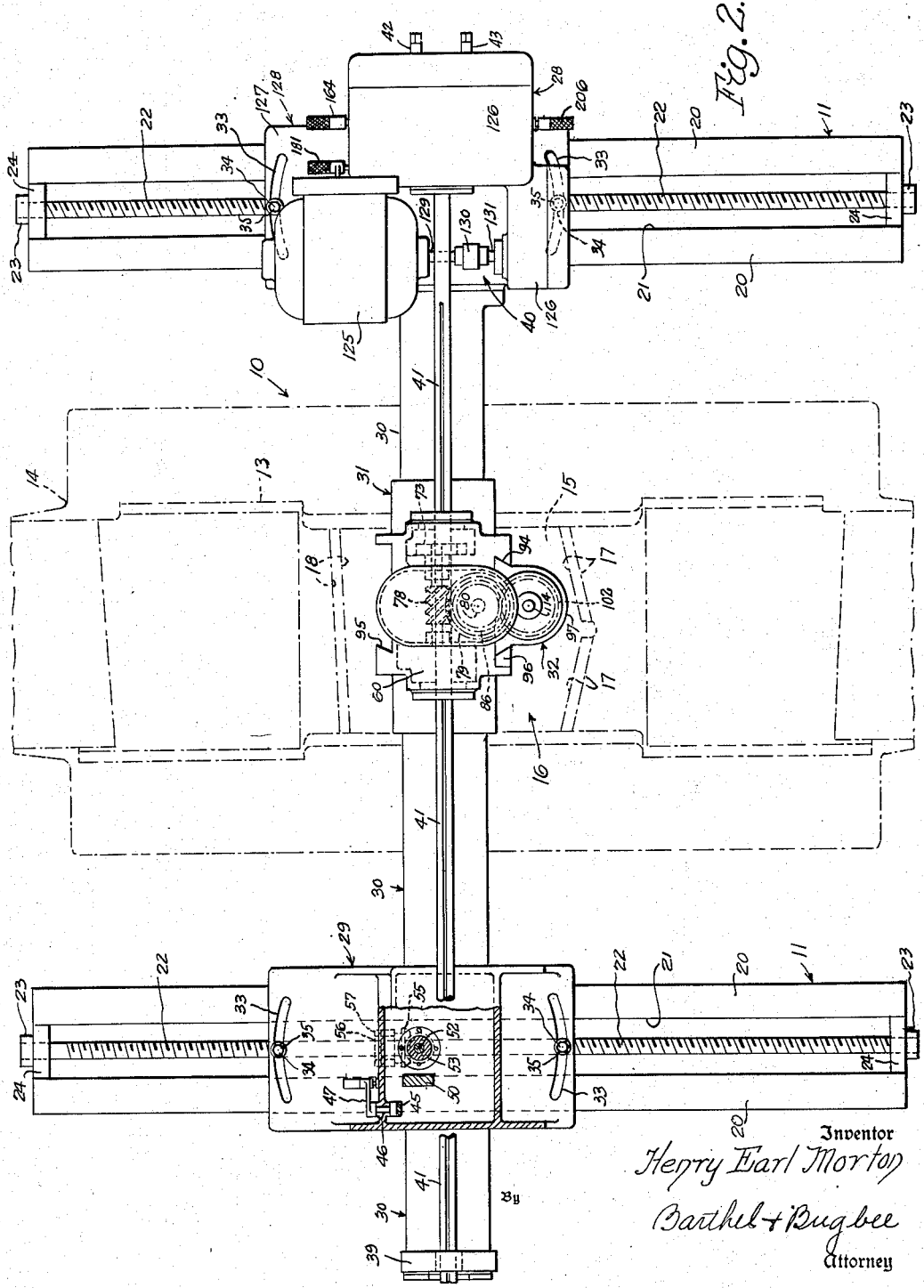

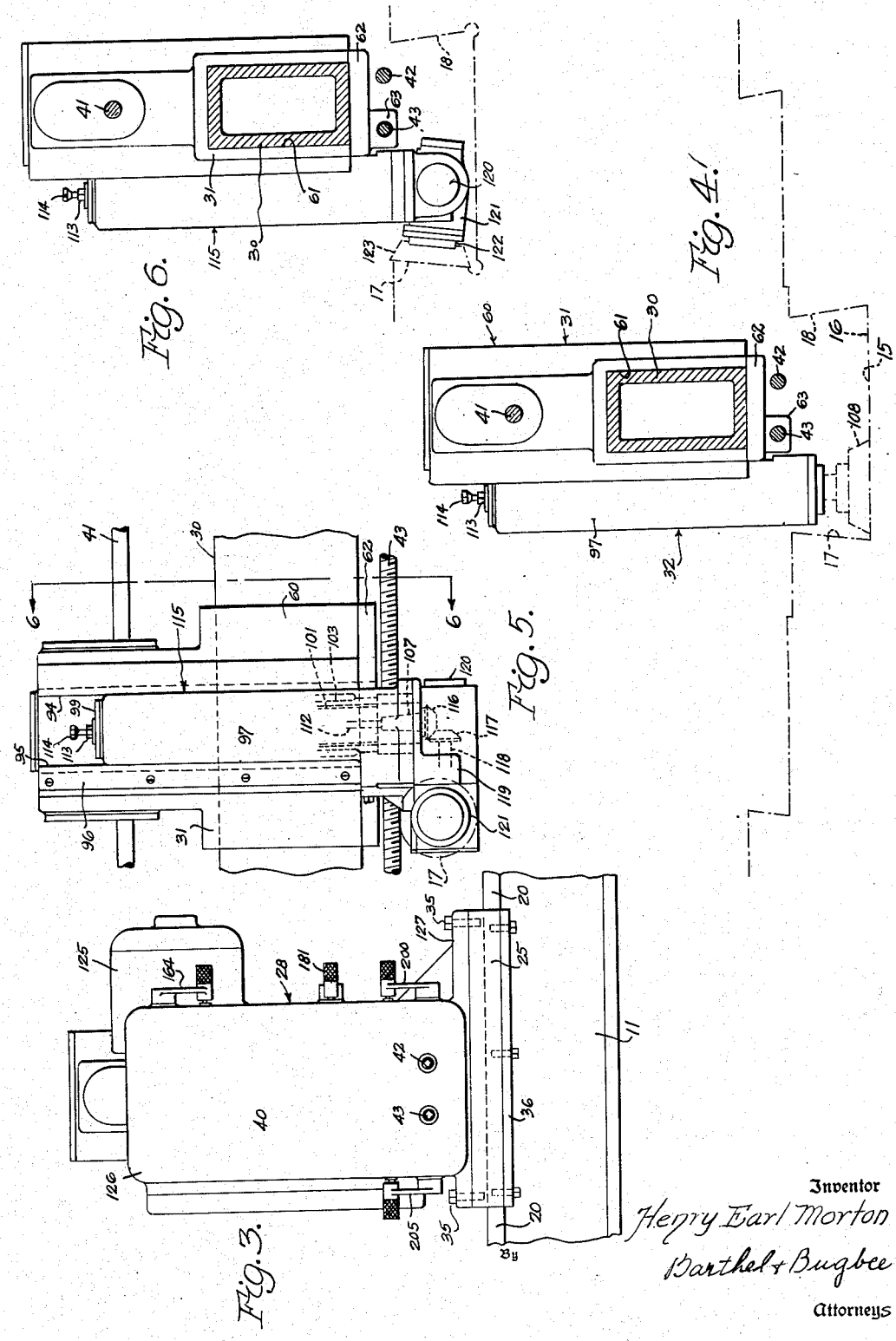

Nov. 24, 1953

H. E. MORTON 2,660,096

PORTABLE MILLING MACHINE

Filed Nov. 16, 1948

Inventor
Henry Earl Morton
Barthel & Bugbee
Attorneys

Nov. 24, 1953

H. E. MORTON 2,660,096

PORTABLE MILLING MACHINE

Filed Nov. 16, 1948

Inventor
Henry Earl Morton
Barthel & Bugbee
Attorneys

Nov. 24, 1953  H. E. MORTON  2,660,096
PORTABLE MILLING MACHINE
Filed Nov. 16, 1948  7 Sheets-Sheet 6

Inventor
Henry Earl Morton
Barthel & Bugbee
Attorneys

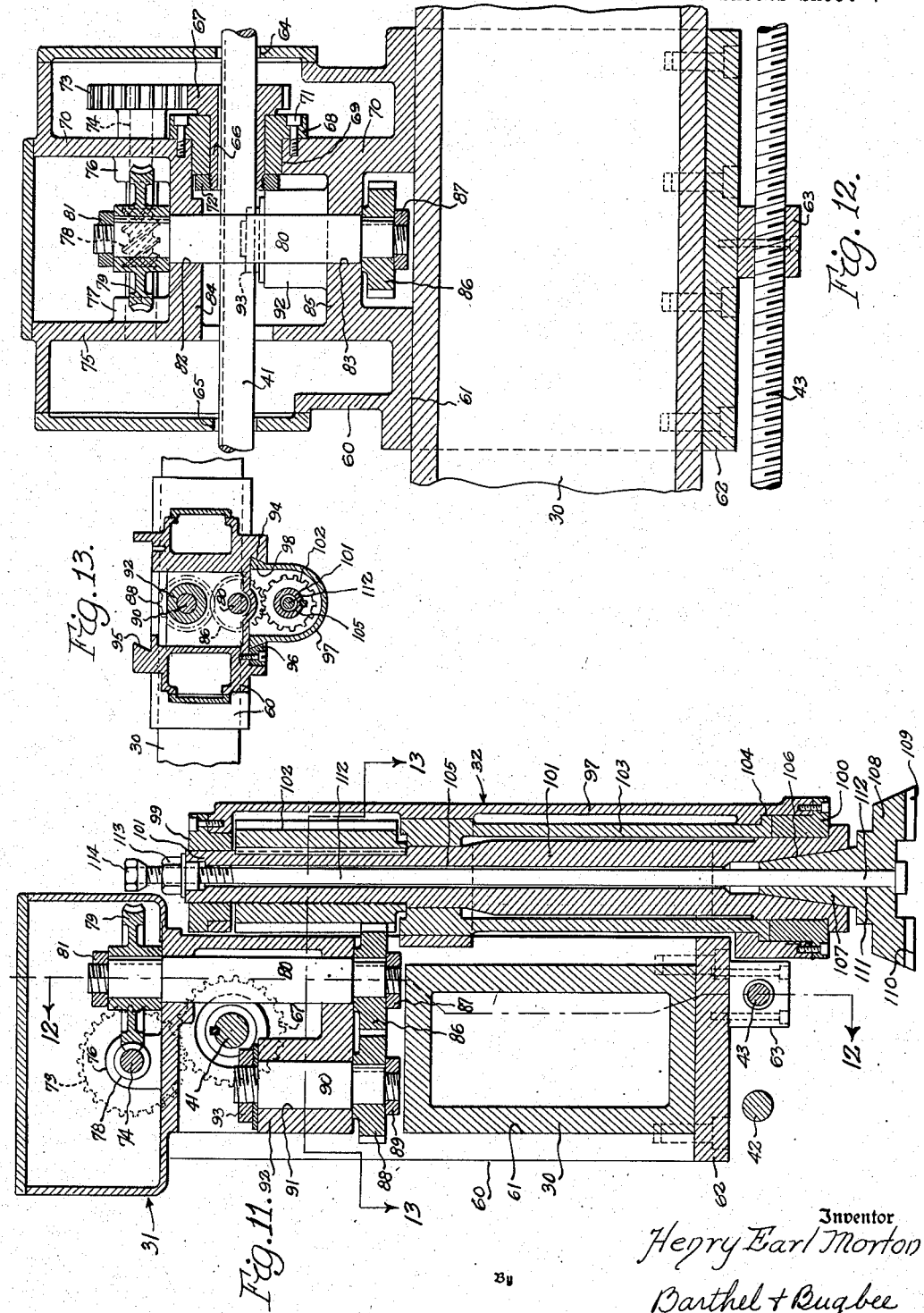

Patented Nov. 24, 1953

2,660,096

UNITED STATES PATENT OFFICE 2,660,096

PORTABLE MILLING MACHINE

Henry Earl Morton, Muskegon Heights, Mich., assignor to Morton Manufacturing Company, Muskegon Heights, Mich., a corporation of Michigan Application November 16, 1948, Serial No. 60,339

10 Claims. (Cl. 90—15)

This invention relates to machine tools and, in particular to milling machines.

One object of this invention is to provide a milling machine which is adapted to be moved into position over the base or other portion of another machine to machine the base and thereby maintain it in an accurate condition, as well as to restore the base to this condition after it has become deformed during use.

Another object is to provide a portable milling machine which is attachable to and detachable from the base or other deformed portion of a machine to be remachined, without the necessity of removing the base from the foundation or otherwise dismantling the machine, the milling machine having a multiplicity of adjustments whereby it is enabled to cut an accurate surface of any desired inclination, as well as to restore a deformed surface to its original accurate condition.

Another object is to provide a milling machine of the foregoing character which is adapted to remachine the base of a machine which is subjected to deformation under severe working conditions, for example, the base of a power hammer, so as to maintain the hammer base in a perfect condition and thereby to insure that the workpieces produced by the machine will be accurate in shape and of the desired dimension.

Another object is to provide a portable milling machine of the foregoing character wherein the cutter head is mounted upon a cross-beam, the ends of which are movable to and fro along parallel guideways, adjustments being provided for moving one end or the other of the cross-beam along the guideways as well as to move the cutter head along the cross-beam so as to position it accurately relatively to the surface to be machined, the cutter head being also provided with a vertical adjustment for raising and lowering the cutter relatively to the surface to be machined.

Another object is to provide a portable milling machine of the foregoing character wherein the cutter head is provided with a power-operated feeding mechanism by which it may be fed both longitudinally and transversely relatively to the surface to be machined.

Another object is to provide a portable milling machine of the foregoing character wherein the cutter head may be shifted from one side of the cross-beam to the other or provided with an angled cutting attachment whereby the machine may cut the angled sides of a dovetail groove as well as the bottom thereof.

Another object is to provide a portable milling machine of the foregoing character which is exceptionally compact and low in height so that it can be readily attached to and detached from the machine to be resurfaced with a minimum of disturbance of the parts of the machine being serviced.

In the drawings:

Figure 2 is a top plan view, partly in horizontal section, of the machine shown in Figure 1;

Figure 3 is a right-hand end elevation of the machine shown in Figures 1 and 2;

Figure 4 is a vertical section along the line 4—4 in Figure 1, showing details of the cutter head;

Figure 5 is a fragmentary front elevation of a modification of Figure 1, showing an angled cutter head for cutting vertical or inclined surfaces;

Figure 6 is a view similar to Figure 4 but showing the angled cutter head of Figure 5;

Figure 11 is a central vertical section through the cutter head and adjacent structure taken along the line 11—11 in Figure 1;

Figure 12 is a vertical section through the cutter head taken along the line 12—12 in Figure 11 and substantially at right angles thereto; and Figure 13 is a horizontal section through the cutter head and adjacent structure taken along the line 13—13 in Figure 11.

Hitherto, the upkeep of heavy duty machines subject to deformation during use has presented a difficult problem to the user, particularly as regards the remachining of the deformed surfaces to restore them as nearly as possible to their original condition. This problem is particularly difficult of solution with respect to the beds or bases of power hammers, especially in the case of very large power hammers, the bases of which are subjected constantly to heavy blows during use. The remachining of such deformed surfaces has hitherto required the dismantling of the machine and the improvisation of cutting mechanisms for recutting the deformed surfaces. The problem is particularly urgent and difficult where, as is frequently the case, the surfaces to be remachined are not entirely flat but have relatively angled portions, such as the sides and ends of dovetail grooves, sockets or recesses.

The portable milling machines of the present invention solves these problems with ease and rapidity, and without the necessity of dismantling the power hammer or other machine, or of removing therefrom the bed or other portion which is to be remachined. The milling machine, in general, consists of horizontal parallel rails which are attachable to the so-called housings of power hammers, these horizontal rails supporting a horizontal rectangular cross-beam, the ends of which are movable to and fro along these rails. The cross-beam, in turn, carries a saddle or carriage movable horizontally lengthwise thereof and supporting a vertically movable cutter head which carries a cutter adapted to perform the machining operations on the base or the other portion to be resurfaced. The machine is provided with mechanism whereby the ends of the cross-beam may be moved horizontally along the rails, or the saddle or carriage moved horizontally along the cross-beam, both for adjustment and feeding purposes. The spindle of the machine is also adjustable vertically, and furthermore can be shifted from one side of the saddle or carriage to the other side so as to work up close to corners in a confined slot. When the re-machining has been done, the machine is easily removed.

General construction

Figure 1:
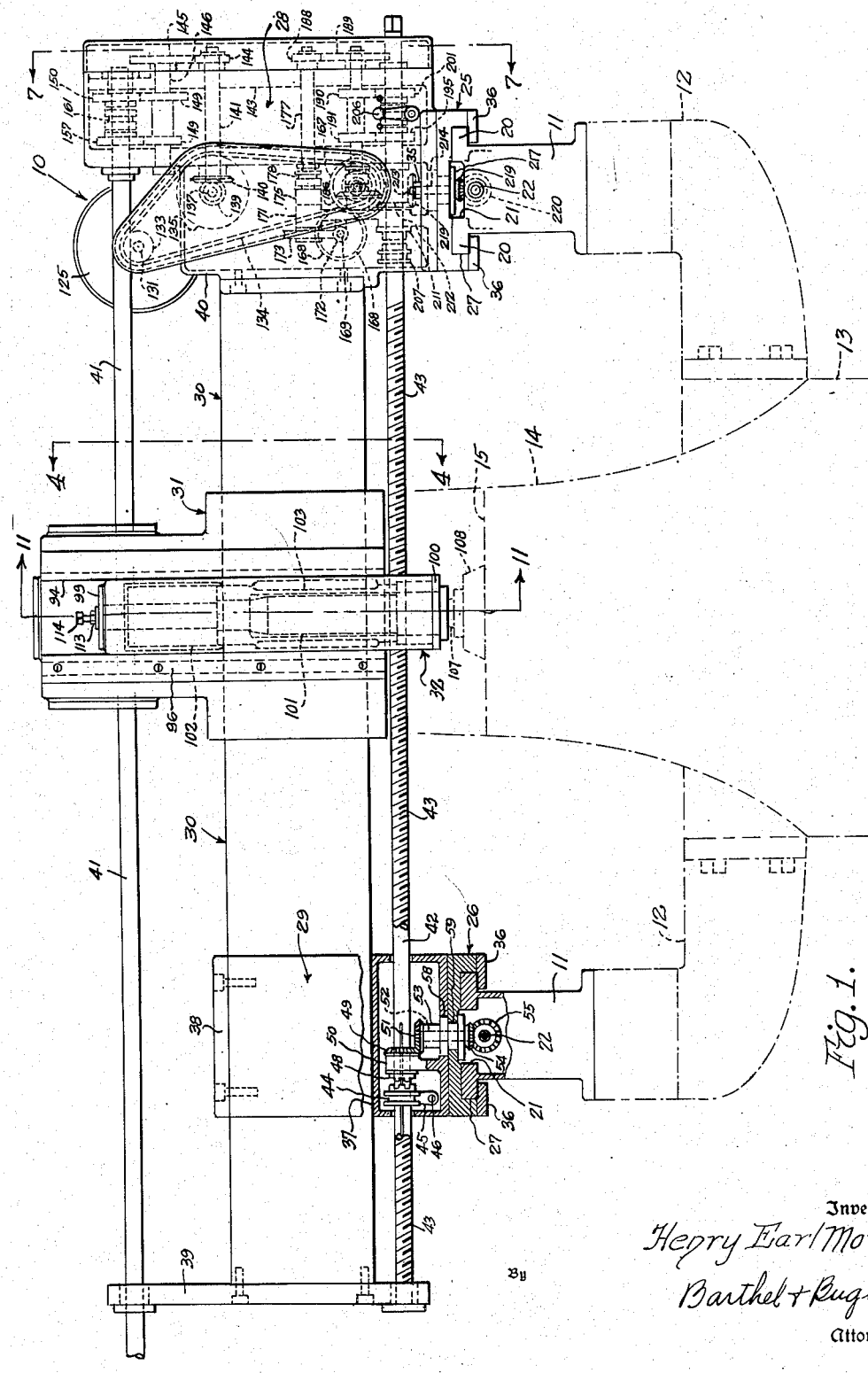
Figure 1 is a front elevation, partly in vertical section, of a portable milling machine according to a preferred form of the invention.

Referring to the drawings in detail, Figures 1 and 2 show a portable milling machine, generally designated 10, according to a preferred form of the invention. The milling machine 10 is provided with substantially horizontal parallel rails 11 mounted upon angle brackets 12, which are in turn bolted or otherwise secured to the base 13 of the power hammer or other machine 14, the horizontal surface 15 of which is to be resurfaced. It is assumed that the surface 15 is subject to deformation, such as is caused by the blows of the hammer. As is frequently the case, (Figure 4) the surface 15 forms the bottom of a dovetail groove 16 having inclined opposite side walls 17 and 18 which also must be maintained in an accurate condition. As shown in Figure 2, the side wall 17 consists of two portions which are inclined both horizontally and vertically so as to present two relatively angled portions when viewed from above. The opposite side wall 18 is likewise angled both horizontally and vertically but consists of a single surface. It is this groove 16 which receives the anvil or work support of the power hammer or other machine to be resurfaced. The housings 12 are in turn mounted upon the base 13 of the power hammer 14.

Figure 9:
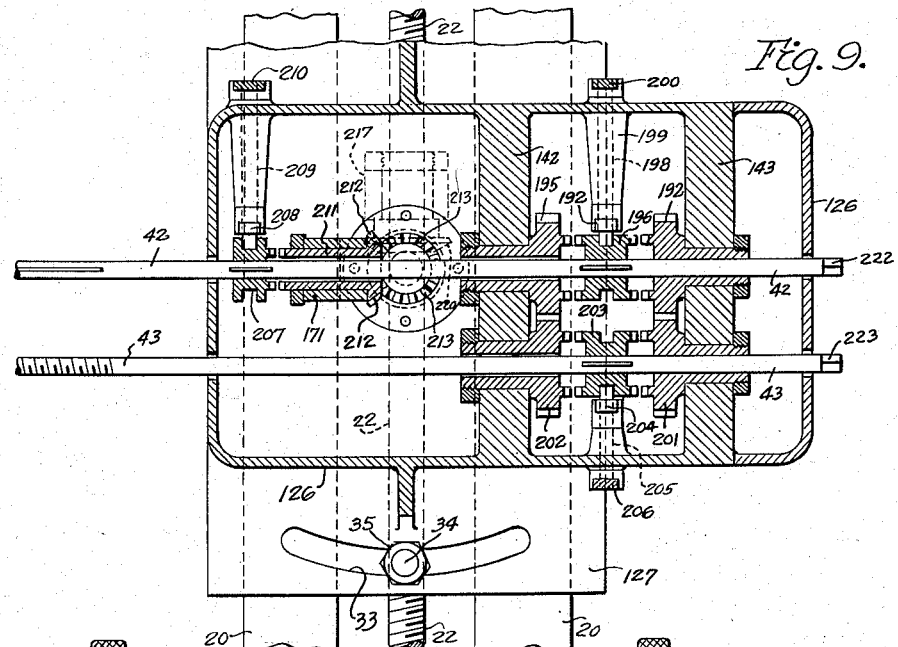
Figure 9 is a horizontal section through the driving mechanism unit, taken along the line 9—9 in Figure 7.

The upper edges of the horizontal rails 11 are provided with parallel guide ribs 20 which are accurately machined and spaced apart from one another to provide a longitudinal slot 21 through which access is obtained to a screw shaft 22 which is fixed as at 23 against rotation in the opposite end walls 24 of the rails 11. The rails 11 serve to slidably receive right-hand and left-hand sub-saddles 25 and 26 (Figure 1) properly gibbed as at 27 and fitted for horizontal travel along these horizontal rails 11. Pivotally mounted on the sub-saddles 25 and 26 in a manner more particularly described below are a driving mechanism unit and an outer swivel support bracket generally designated 28 and 29 respectively (Figures 1 and 2). These, in turn, between them support a substantially horizontal cross-beam generally designated 30 upon which travels a saddle or carriage generally designated 31, the latter, in turn, carrying a vertically-movable cutter head, generally designated 32. In order to clamp the units 28 and 29 to their respective sub-saddles 25 and 26, the former are arcuately slotted as at 33 (Figures 2 and 9) around their pivotal axes as centers to receive studs 34 threaded into the sub-saddles 25 and 26 respectively, and carrying nuts 35 threaded thereon. The sub-saddles 25 and 26 are provided with retaining bars 36 bolted to the lower edges thereof so as to retain them in position while permitting reciprocating motion or travel along the rails 11.

Outer swivel support bracket construction

The outer swivel support bracket 29 is provided with a large rectangular horizontal slot 37 (Figure 1) through which the cross-beam 30 slidably passes and is retained in place by the top plate 38 bolted to the bracket 29. Bolted to the outer end of the cross-beam 30 is a vertical bracket 39. The inner end of the cross beam 30 is bolted to the housing 40 of the driving mechanism unit 28. Journaled at their opposite ends in the bracket 39 and housing 40 are upper and lower spline shafts 41 and 42 respectively and a rotatable screw shaft 43. In Figure 1, a portion of the screw shaft 43 near its left-hand end is broken away so as to disclose the lower spline shaft 42 immediately behind it. The upper spline shaft 41 transmits power to the cutter head 32 to rotate the cutter thereof. The lower spline shaft 42 serves to transmit power to the outer swivel support bracket 29 so as to move it longitudinally along the outer rail 11 as described below. The screw shaft 43 when rotated serves to move the cutter head saddle 31 and cutter head 32 along the cross-beam 30.

In order to cause the sub-saddle 26 and outer swivel support bracket 29 to move lengthwise along the outer rail 11, the lower spline shaft 42 has mounted thereon and splined thereto a sliding jaw-toothed clutch collar 44 (Figure 1) engaged by a shift arm 45 mounted on a shaft 46 which, in turn, is journaled in the outer swivel support bracket 29 (Figure 2) and on its outer end carries a hand crank 47 by which it may be shifted to and fro. The teeth of the clutch collar 44 are engageable with corresponding teeth on the tubular hub 48 of a bevel pinion 49 which is bored for the passage of the spline shaft 42 and is journaled in a bracket 50 extending upward from the bottom wall of the outer swivel support bracket 29 (Figure 1). The bevel pinion 49 in turn meshes with a bevel pinion 51 mounted on a vertical shaft 52 which is journaled in and extends downward through a tubular pivot shaft 53 and carries on its lower end a bevel pinion 54 meshing with a bevel pinion 55 forming a part of and integral with an internally threaded nut 56 (Figure 2) threaded upon the outer screw shaft 22 and rotatably supported in a bracket 57 which extends downward through the outer slot 21 from the sub-saddle 26. The construction of the nut 56 and bracket 57 is similar to that shown at the very bottom of Figures 7 and 8 subsequently to be described in connection with the driving mechanism unit 28. The tubular pivot shaft 53 (Figure 1) is journaled in co-axial bores 58 and 59 in the adjacent walls of the outer swivel support bracket 29 and outer sub-saddle 26 respectively.

*Cutter head and saddle construction*

The cross-beam 30 (Figure 11) is of hollow rectangular construction so as to be as rigid as possible, and is accurately machined for the travel of the cutter head saddle 31 to and fro. The cutter head saddle 31 consists of a hollow housing 60 (Figures 1 and 2) through which passes a slot 61 of rectangular cross-section accurately fitted to the machined surfaces of the cross-beam 30. Bolted to the bottom plate 62 of the housing 60 is an internally threaded nut 63 (Figures 11 and 12) which is threaded onto the screw shaft 43. Thus, when the screw shaft 43 is rotated by the mechanism within the driving mechanism unit 28, as described below, the housing 60 of the saddle 31 travels to and fro along the cross-beam 30, carrying with it the cutter head 32. The bottom plate 62 of the housing 60 is bolted to the housing 60 in a manner similar to the bolting of the top plate 38 of the outer swivel support bracket 29.

The spline shaft 41 passes through apertures 64 and 65 (Figure 12) in the opposite outer walls of the housing 60 and also passes through the hub 66 of a gear 67 which is splined thereto. The hub 66 of the gear 67 is journaled in a flanged bearing sleeve 68 which, in turn, is mounted in a bore 69 in the housing wall 70 and bolted thereto as at 71. The hub 66 is threaded at one end and carries thereon a retaining nut 72. Meshing with the gear 67 is an upper gear 73 mounted on a shaft 74 which is journaled in the interior walls or partitions 70 and 75 of the housing 60, these walls being suitably bossed for that purpose as at 76 and 77. Mounted on the shaft 74 is a worm 78 which meshes with a worm gear 79 mounted on a vertical shaft 80 and held in position on a reduced diameter portion thereof by a nut 81 threaded on the threaded upper end thereof. The shaft 80 is journaled in aligned bores 82 and 83 in the housing walls or partitions 84 and 85 respectively, and on its lower end carries a gear 86 held thereon by a retaining nut 87 threaded on the threaded lower end of the shaft 80.

Meshing with the gear 86 (Figure 11) is a gear 88 secured by the retaining nut 89 to the lower end of a vertical shaft 90. The latter is journaled in a bore 91 in a bearing boss 92 extending upward from the housing partition 85 and on its upper end has a retaining nut 93 threaded thereon. The gear 88 is an idler gear which, as will be seen later, serves to transmit the drive to the cutter head 32 when the latter is moved to the opposite side of the housing 60. For this purpose, the housing 60 on its opposite sides is provided with vertical dovetail grooves 94 and 95 (Figure 13) closed by gibs 96 bolted thereto.

The housing 97 of the cutter head 32 is provided along its rearward side with a dovetail portion 98 fitting into the dovetail groove 94 or 95 so as to slide vertically therein. Journaled in the flanged collars 99 and 100 forming the upper and lower end plates of the housing 97 (Figure 11) is a hollow cutter spindle 101 to which an elongated pinion 102 is keyed, the pinion 102 being in mesh with the gear 86 (or when the cutter head 32 is shifted to the dovetail slot 94, in mesh with the idler gear 88). The spindle 101 is also surrounded by a sleeve 103 having its upper end engaging the lower end of the pinion 102 and having its lower end flanged and fitting into the counterbore 104 in which the lower collar 100 is seated. The upper end of the sleeve 103 also engages the midportion of the hollow spindle 101 immediately below the elongated pinion 102 and gives it additional support.

The hollow spindle 101 is provided with a central bore 105 opening into a conical mouth or socket 106 at its lower end (Figure 11). Seated in the socket 106 is the correspondingly conical or tapered stem 107 of a milling cutter 108 having cutting teeth 109 around the periphery of its cutting face 110. The cutter 108 is bored longitudinally at 111 to receive a retaining bolt 112 which likewise passes upward through the spindle bore 105 and is threaded on its upper end to receive a retaining nut 113 and an additional nut 114. When the nuts 113 and 114 are removed, the bolt 112 may be withdrawn, permitting the cutter 108 to be removed and resharpened or replaced.

*Angle cutter head construction*

The angle cutter head 115 (Figures 5 and 6) is generally similar to the cutter head 32 except for the construction at its lower end, and is similarly mounted in either of the dovetail grooves 94 or 95. The internal construction of the angle cutter head 115 is therefore similar to that of the straight cutter head 32 as shown in Figures 11, 12 and 13, and similar parts are similarly designated. In place of the straight cutter or face cutter 108, however, the tapered hub of a bevel gear 116 is inserted in the socket 106 of the spindle 101 and meshes with a bevel gear 117 on a horizontal shaft 118 journaled in an angle bracket 119 mounted on the lower end of the housing 97.

Swiveled upon the angle bracket 119 as by the pivot shaft 120 (Figure 6) is an angle cutter support 121 in which a hollow angle cutter shaft 122 is journaled and drivingly connected to the shaft 118 by bevel gearing (not shown). The angle cutter shaft 122 (Figure 6) is also provided with a conical socket for receiving a face cutter 123 similar to the face cutter 108 used in the direct or straight cutter head 32. The support 121 may be swiveled around its pivot shaft 120 so as to place the face of the face cutter 123 at any desired angle, such as to cut the inclined side walls 17 and 18 of the dovetail groove 16. Thus, the angle cutter head 115 is interchangeable with the straight cutter head 32 to machine surfaces presented at any angle.

*Driving mechanism unit construction*

The driving mechanism unit 28 by which power is transmitted from a motor 125 to drive the spline shafts 41 and 42 or the screw shaft 43 either simultaneously or separately in a forward or reverse direction is shown generally in Figures 1, 2 and 3 and, in detail, in Figures 7, 8, 9 and 10. The unit 28 is provided with a housing 126 the lower end of which expands into a flat base 127 having a machined lower surface 128 resting upon the sub-saddle 25 and, as previously stated, provided with arcuate slots 33 receiving studs 34 threaded into the sub-saddle 25 and carrying lock nuts 35 on the upper ends thereof. As previously stated, the arcuate slots 33 are centered on the pivotal axis of the housing 126 relatively to the sub-saddle 25 on which is pivots.

Figure 7:
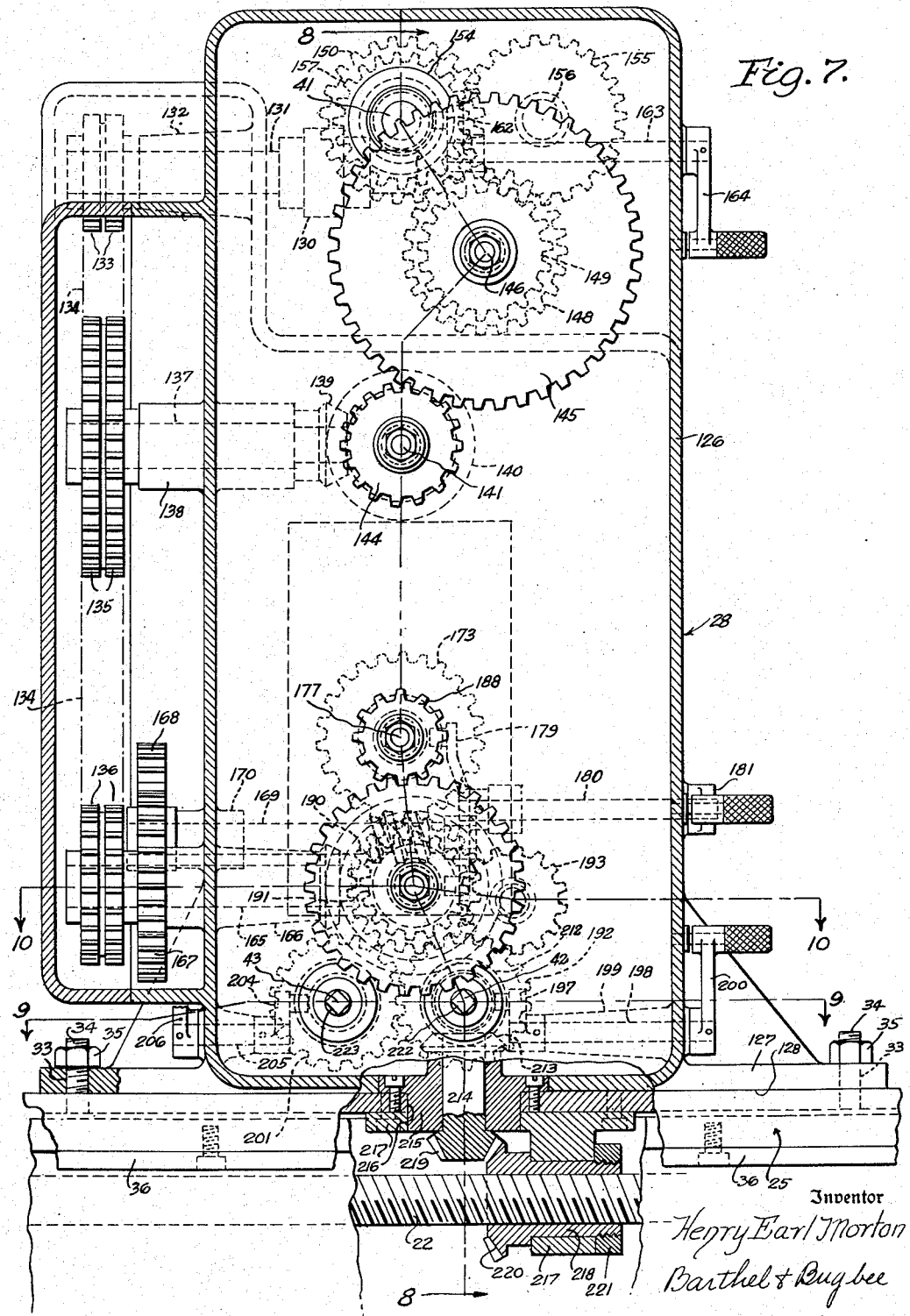
Figure 7 is a vertical section through the driving mechanism unit, taken along the line 7—7 in Figure 1.

The motor 125 is mounted on the upper portion of the housing 126 and its armature shaft 129 is connected by a coupling 130 to an input shaft 131 (Figure 2) which is journaled in a bearing boss 132 (Figure 7) in the interior of the housing 126. Mounted on the end of the input shaft 131 are twin sprockets 133 with which mesh sprocket chains 134 extending around and meshing with twin sets of sprockets 135 and 136 respectively (Figure 7). The sprockets 135 are mounted on the outer end of a shaft 137 journaled in a bearing boss 138 and carrying on its inner end a bevel pinion 139 which meshes with a bevel gear 140 mounted on a shaft 141. The shaft 141 is journaled in the partition walls 142 and 143 (Figure 8) of the housing 126, and on its opposite end carries a pinion 144 which meshes with a gear 145 mounted on one end of a shaft 146, likewise journaled in the partition walls 142 and 143 and parallel to the shaft 141.

Figure 8:
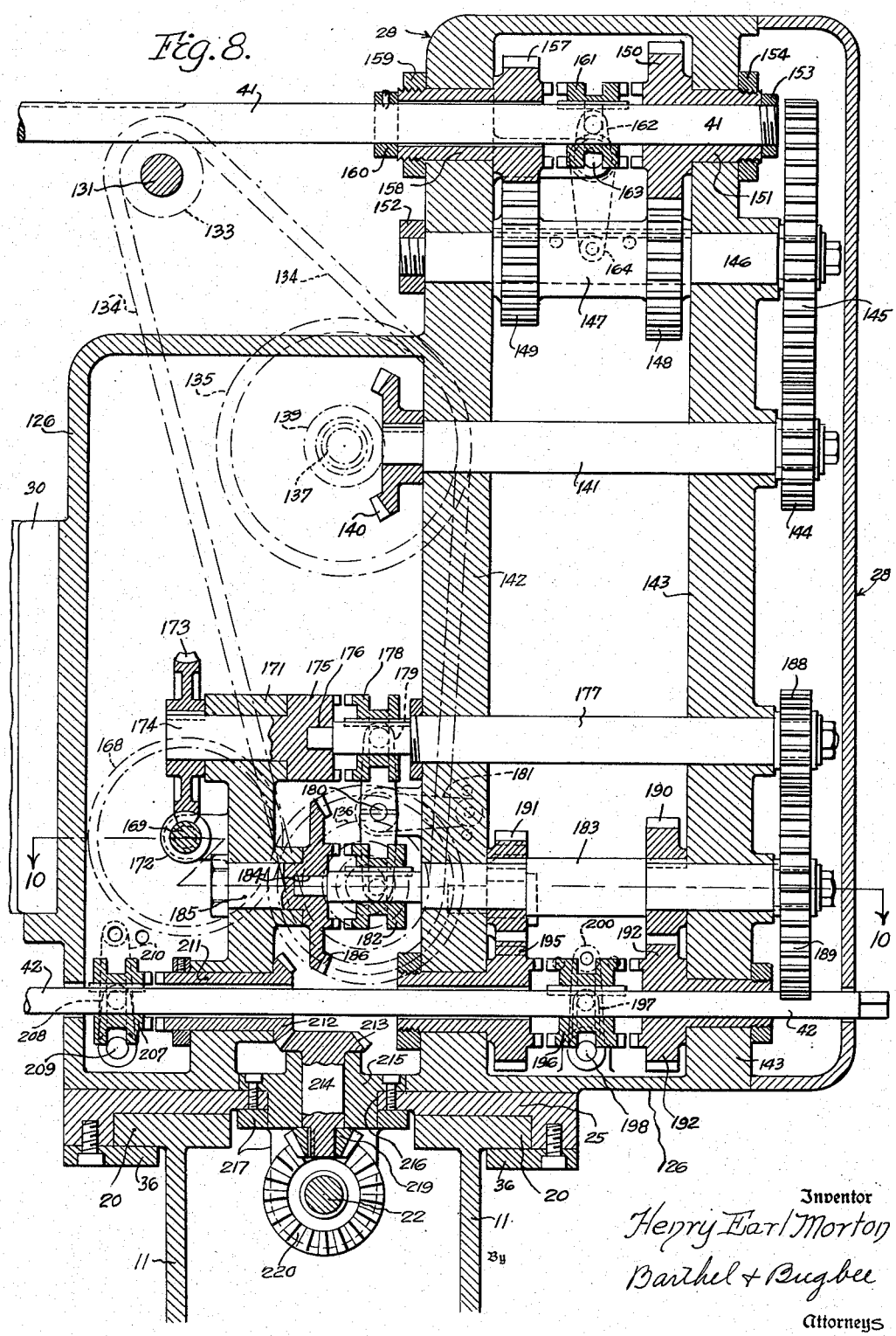
Figure 8 is a vertical section through the driving mechanism unit, taken along the line 8—8 in Figure 7 and at right angles to Figure 7.

Keyed to the shaft 146 (Figure 8) is a hub 147 carrying twin gears 148 and 149, the gear 148 meshing with a gear 150 having a hub 151 journaled in the partition wall 143 and bored to loosely and rotatably receive the upper spline shaft 41. Retaining nuts 152, 153 and 154 hold the shafts 146, 41 and gear 150 in proper relative positions. The twin gear 149 in contrast meshes with an idler gear 155 mounted on a shaft 156 journaled in the partition wall 142 (Figure 7) and meshing with a gear 157, the hub 158 of which is journaled in the partition wall 142 and held in position by a retaining nut 159 and collar 160 (Figure 8). The gears 150 and 157 on their adjacent faces are provided with jaw clutch teeth adapted to mesh with corresponding clutch teeth on the opposite ends of a sliding jaw clutch collar 161 which is keyed or splined to the upper spline shaft 41 and is annularly grooved to receive the upper end of a shaft arm or yoke 162 mounted upon the inner end of a shaft 163 journaled in the housing 126 and carrying on its outer end a shaft crank 164 (Figure 7). In this manner the clutch collar 161 may be shifted to the fro along the upper spline shaft 41 to drive the latter in a forward or reverse direction depending on which of the gears 150 and 157 is drivingly engaged by the clutch collar 161 at a given time.

The lower twin sprockets 136 (Figure 10) are mounted on a shaft 165 which is journaled in a bearing boss 166 in the housing 126 and which has keyed to it a gear 167 meshing with a gear 168 mounted on a shaft 169 which is journaled at one end in a bearing boss 170 in the housing 126, and at its opposite end in a bracket 171 forming a part of the housing 126. The shaft 169 carries a worm 172 which meshes with a worm gear 173 mounted on a shaft 174 which is likewise journaled in the bearing bracket 171 and which at its other end has an enlarged toothed jaw clutch head 175 (Figure 8) with a socket 176. Mounted for free rotation in the socket 176 is the reduced diameter end of a shaft 177 which is drivingly connected to the shaft 174 by a toothed sliding jaw clutch collar 178. The latter is keyed or splined to the shaft 177 and is annularly grooved for engagement by the upper end of a shift lever 179 so as to throw the teeth of the clutch collar 178 into or out of engagement with the teeth on the clutch head 175.

Figure 10:
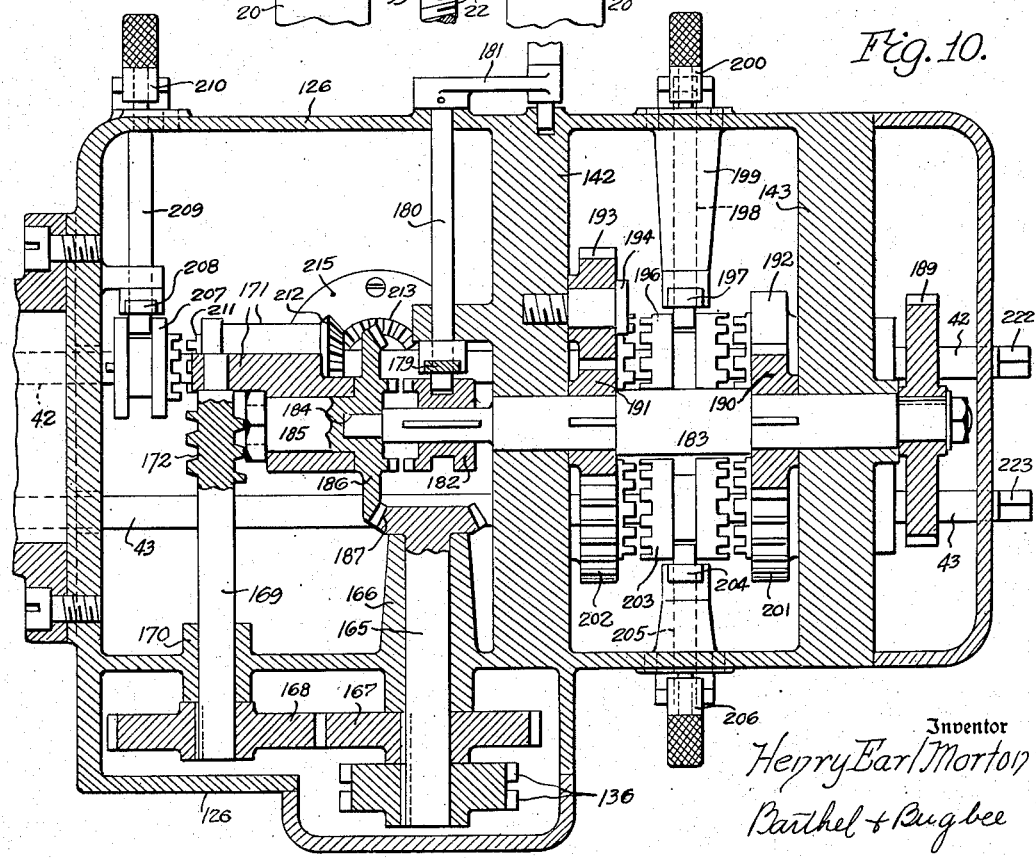
Figure 10 is another horizontal section through the driving mechanism unit, taken along the line 10—10 in Figure 7.

The lever 179 is mounted on the inner end of a shaft 180 (Figure 10) journaled in the housing 126 and on its outer end carrying a hand crank 181. The lower end of the lever 179 engages an annularly grooved slidable jaw clutch collar 182 keyed or splined to a shaft 183, the inner end of which is loosely and rotatably supported in a socket 184 in the end of a shaft 185 carrying a bevel gear 186 and journaled in the bearing bracket 171. The jaw clutch collar 182 and bevel gear 186 carry interengageable clutch teeth which are engaged while the clutch teeth of the collar 178 and head 175 are disengaged and vice versa, due to the action of the shift lever 179. The bevel gear 186 is driven by a bevel pinion 187 mounted on the inner end of the shaft 165 (Figure 10). Thus, only one of the shafts 177 and 183 rotates at a given time but they are drivingly interconnected by a pinion 188 mounted on the shaft 177 and meshing with a gear 189 mounted on the end of the shaft 183 (Figure 8).

Keyed to the shaft 183 are spaced pinions 190 and 191 (Figure 8). The former meshes directly with a gear 192 loosely and rotatably mounted on the lower spline shaft 42 and having its hub journaled in the partition wall 143. The pinion 191, on the other hand, meshes with an idler pinion 193 which is loosely and rotatably mounted on a stud 194 threaded into the partition wall 142. The pinion 193 in turn meshes with a gear 195 the hub of which is journaled in the partition wall 142 (Figure 8) and which is bored for the passage of the lower spline shaft 42. The faces of the gears 192 and 195 are provided with jaw clutch teeth adapted to be engaged by corresponding jaw clutch teeth on the opposite ends of an annularly grooved sliding clutch collar 196 which is engaged by a shift arm 197 mounted on a shaft 198 which is journaled in the housing boss 199 and carries on its outer end a hand crank 200 (Figure 10). Thus, by shifting the arm 197 and clutch collar 196 in one direction or the other, the lower spline shaft 42 may be driven either in a direct or reverse direction from the shaft 183 and by shifting the shift lever 179 (Figure 8) in one direction or the other the shaft 183 may be driven at high speed or low speed, as desired, depending on whether a rapid traversing speed or a feeding speed is desired.

Meshing with the gears 192 and 195 respectively are gears 201 and 202 the hubs of which are journaled respectively in the partition walls 143 and 142 and are bored for the free passage of the screw shaft 43. Slidably mounted on the unthreaded portion of the screw shaft 43 between the gears 201 and 202 and keyed or splined to the shaft 43 is a toothed jaw clutch collar 203 (Figure 9) which is selectively engageable with similar clutch teeth on the faces of the gears 201 and 202. The jaw clutch collar 203 is annularly grooved to receive the upper end of a shifting arm 204, the lower end of which is mounted on a shaft 205 and carries a hand crank 206. By this arrangement, the screwshaft 43 is drivingly connected either to the gear 192 or to the gear 195 for motion in a forward or reverse direction at high or low speed, depending on the setting of the shift lever 179 and clutch collars 178 and 182 (Figure 8).

Slidably mounted on the lower spline shaft 42 is a toothed jaw clutch collar 207 (Figure 8) which is annularly grooved for engagement by the upper end of a shift arm 208, the lower end of which is mounted on a shaft 209 which is journaled in the housing 126 (Figure 10) and on its outer end carries a hand crank 210. The teeth of the clutch collar 207 are selectively engageable with similar clutch teeth on the left-hand end of the hub 211 (Figure 8) of a bevel gear 212. The hub 211 is bored to loosely and rotatably receive the spline shaft 42 and is, in turn, journaled in the bearing bracket 171. The bevel gear 212 meshes with a bevel gear 213 mounted on a shaft 214 which is journaled in a flanged sleeve or collar 215 bolted into an aperture 216 in the sub-saddle 25. The sleeve 215 thus serves not only as a journal bearing for the shaft 214, but also as a hollow pivot shaft for the housing 126 around the sub-saddle 25. Bolted to the sub-saddle 25 is an angle bracket 217, one arm of which is bored for the reception of the sleeve 215 and the other arm of which is bored to rotatably receive an internally threaded nut 218 which is threaded upon the screw shaft 22. The lower end of the shaft 214 carries a bevel pinion 219 which meshes with a bevel gear 220 on the end of the nut 218, which is held in position by a retaining collar 221 threaded upon the opposite end of the nut 218. The lower spline shaft 42 and the screw shaft 43 are squared at their outer ends 222 and 223 respectively for the reception of a hand crank (not shown) for manually rotating the shafts.

Operation

In the operation of the milling machines of this invention, let it be assumed that the bottom surface 15 of the dovetail groove 16 in the base 13 which receives the anvil of a power hammer 14 has been deformed by long continued blows of the hammer and has to be resurfaced. Let it also be assumed that the angle brackets 12 which are adapted to be secured to the base 13 have been previously prepared and either previously and permanently secured where conditions permit or, where this is not possible, have been secured to the base 13 after the anvil has been removed in preparation for milling operations. The parallel rails 11 are then mounted in parallel relationship upon the upper surfaces of the angle brackets 12 and secured in position by bolts or other suitable fasteners. The rails 11 are made in various lengths to meet the requirements of the particular machine and are mounted not only parallel to each other but also parallel to the centerline of the base 13 of the machine 14. The sub-saddles 25 and 26 and the driving mechanism unit and outer swivel support brackets 28 and 29 respectively are then mounted in the positions of Figures 1 and 2 on the upper surfaces of the rails 11, slidably engaging the guide ribs 20. The cross-beam 30 is also secured in its proper position between the units 28 and 29, with the cutter head carriage or saddle 31 reciprocably mounted thereon. The cutter head 32 is mounted in whichever of the vertical dovetail grooves 94 or 95 is best adapted to the milling operation to be performed. If the angle cutter head 115 is to be used to mill the side walls 17 of the dovetail groove 16, the cutter head 32 is placed in the vertical dovetail groove 94 (Figure 2) whereas, if the side wall 18 is to be machined, the cutter head 115 is mounted in the vertical dovetail groove 95.

With the parts properly lined up, as shown in Figures 1 and 2, let it be assumed that in order to position the cross-beam 30 properly to machine the dovetail groove 16, the driving mechanism unit 28 and the outer swivel support bracket 29 have to be moved along the parallel rails 11. Before this is done, the nuts 35 are loosened so as to permit swiveling of these units on their sub-saddles 25 and 26 and corresponding motion of the studs 34 in the arcuate slots 33.

Assuming that the various hand cranks are in their neutral positions, as shown in the various figures of the drawings, so that all of the clutches controlled thereby are likewise in their neutral positions, the operator starts the motor 125, thereby rotating the input shaft 131 and drive sprockets 133 of the driving mechanism unit 28, causing travel of the sprocket chains 134 and consequently imparting rotation to the shafts 141, 174 and 185 (Figure 8).

The hand crank 181 is now shifted in one direction or the other to cause one of the clutch collars 178 or 182 to be engaged with its respective teeth (Figure 8). If a rapid motion is desired, rather than a slow feeding motion, the hand crank 181 is shifted downward to engage the clutch collar 182 with the teeth of the bevel clutch gear 184. By this clutching engagement, the shaft 183 is started rotating, consequently rotating the clutch gears 190 and 191 at a relatively high or "rapid traverse" speed.

To rotate the lower spline shaft 42 other than manually, the operator shifts the hand crank 200 so as to move the jaw clutch collar 196 into clutching engagement with the teeth of the gear 192 (Figures 8, 9 and 10) if the shaft 42 is to be rotated in a forward direction. (If, however, the shaft 42 is to be rotated in a reverse direction, the operator shifts the clutch collar 196 into clutching engagement with the teeth of the gear 195.)

For forward rotation of the lower spline shaft 42, with the clutch collar 196 engaged with the clutch gear 192, power is transmitted from the clutch gear 192 through the collar 196 to the lower spline shaft 42. To cause travel of the driving mechanism unit 28 along its rail 11, the operator shifts the hand lever 210 (Figures 8, 9 and 10) so that the clutch collar 207 is engaged with the teeth on the end of the hub 211 of the bevel gear 212, causing rotation thereof and consequently causing rotation of the bevel gear 213, shaft 214, bevel gears 219 and 220, and the threaded nut 218. As the threaded nut 218 rotates, it, of course, travels along the stationary screw shaft 22, carrying with it the sub-saddle 25 and driving mechanism unit 28. When these have moved to their desired positions, the operator shifts the shift lever 210 in the reverse direction to disengage the clutch collar 207 and move it into its neutral position, halting the rotation of the nut 218.

To similarly position the outer swivel bracket 29 and its sub-saddle, the hand crank 47 thereon (Figures 1 and 2) is shifted to bring the clutch collar 44 into clutching engagement with the toothed hub 48 of the bevel gear 49. Assuming the lower spline shaft 42 to be rotating in the manner described above, the rotation thereof will be imparted to the clutch collar 44, bevel gears 49 and 51, shaft 52, bevel gears 54 and 55, and nut 56. The rotation of the nut 56 upon the stationary screw shaft 22 causes travel of the former along the latter and consequent travel of the sub-saddle 26 and outer swivel support 29 along its rail 11. The hand lever 47 and its clutch collar 44 are then shifted back to their neutral positions. When the driving mechanism unit 28 and outer swivel support 29 have been thus properly positioned, the nuts 35 are tightened to lock each sub-saddle 25 or 26 to the unit 28 or 29 which it supports.

To move the cutter head carriage or saddle 31 along the cross-beam 30 so as to position the cutter head 32 properly with reference to the dovetail groove 16 to be surfaced, the operator causes the screw shaft 43 to rotate in the proper direction and at a rapid traverse speed. Assuming that the motor 125 and input shaft 131 are rotating as before, and that the hand crank 181 is shifted as before to rotate either the shaft 177 or the shaft 183, this rotation which, as previously stated, rotated the clutch gears 192 and 195 co-axial with the lower spline shaft 42 (Figure 8), also rotates the clutch gears 201 and 202 co-axial with the screw shaft 43 and, as previously stated, meshing with the clutch gears 192 and 195 respectively.

The operator now shifts the hand crank 206 so as to shift the clutch collar 203 (Figures 9 and 10) into clutching engagement with the teeth of the clutch gear 201 for forward motion of the screw shaft 43, or 202 for reverse motion thereof, depending upon which is desired. When this is done, the screw shaft 43 is caused to rotate and its engagement with the stationary nut 63 (Figure 11) mounted on the bottom plate 62 of the housing 60 of the cutter head saddle 31 causes the latter to travel along the cross-beam 30 at a rapid traverse speed. When the cutter head 32 has reached its desired position, the operator shifts the hand crank 206 and clutch collar 203 to its neutral position, halting the rotation of the screw shaft 43 and consequently halting the travel of the cutter head saddle or carriage 31.

The cutter head 32 is now moved up or down in its vertical dovetail groove 94 or 95 until the cutter 108 (Figures 4 and 11) is properly positioned with its cutting teeth 109 properly located with reference to the surface 15 to be cut. The upper spline shaft 41 is now started in rotation by shifting the hand crank 164 to engage its clutch collar 161 (Figure 8) either with the clutch gear 150 or with the clutch gear 157, depending upon whether forward or reverse rotation is desired for the spline shaft 41. The spline shaft 41 therefore starts rotating as a result of its driving connection through the clutch collar 161 and clutch gear 150 or 157 with the shaft 146 which, in turn, is driven from the shaft 141 through the gears 145 and 144. This action causes the cutter shaft 101 to be rotated (Figure 11) through the gearing in the upper part of the housing 60 and the elongated pinion 102, rotating the milling cutter 108.

To cause the carriage or saddle 31 and cutter head 32 to move at a feeding speed, the operator shifts the hand crank 181 upward so that the clutch collar 178 is engaged with the teeth of the clutch head 175, thereby causing the shaft 177 (Figure 8) to be driven at a relatively slow feeding speed by reason of the speed reduction brought about by the engagement of the worm 172 with the worm gear 173 on the shaft 174, rather than by the engagement of the bevel pinion 187 (Figure 10) with the bevel gear 186 on the shaft 185, as heretofore described. As a consequence, when the hand crank 206 and clutch collar 203 are appropriately shifted (Figure 10) either into clutching engagement with the forward clutching gear 201 or the reverse clutching gear 202, the screw shaft 43 is rotated at a slow and powerful feeding speed so as to engage the nut 63 as before (Figure 11) and move the rotating cutter 108 in its cutting path over the surface 15.

When the cut has been completed, the direction of the rotation of the screw shaft 43 may be reversed and a reverse cut taken, in the foregoing manner. At any time that it is desirable or necessary, the operator may optionally place a hand crank on the squared ends 222 or 223 of the lower spline shaft 42 or screw shaft 43 to rotate these by hand, such as where irregular surfaces are to be machined or indentations or recesses are to be entered.

When the surface has been completely machined and the side walls 17 or 18 of the dovetail groove 16 are to be machined (Figures 2 and 4), the operator removes the straight cutter head 32 and replaces it with the angle cutter head 115 (Figures 5 and 6). Having adjusted the angle cutter support 121 to the proper angle and clamped it in position by clamping screws or other clamping means (not shown), and thereby properly positioning the cutter 123 at the proper angle relatively to the work surface 17 or 18 to be machined, the operator again applies power to the upper spline shaft 41 and screw shaft 43 in the foregoing manner, causing the cutter 123 to make an appropriate cut along the side wall 17 or 18. If these are inclined relatively to the center line of the machine bed or base 13, as in Figure 2, the operator may position the cross-beam 30 along the line parallel thereto by repeating the procedure described above in connection with positioning the driving mechanism unit 28 and outer swivel support 29 on the rails 11. The subsequent travel of the saddle or cutter head carriage 31 and the angle cutter head 115 in a direction parallel to the side wall surface 17 or 18 causes the latter to be properly cut.

After the milling operations have been completed, the milling machine may be removed by reversing the installation procedure above. The anvil mat may then be reinstalled and use of the power hammer resumed, after having had its accuracy thus restored by the milling operations described above by the aid of the portable milling machine of this invention.

What I claim is:

1. A portable milling machine comprising a pair of substantially horizontal separate elongated supports adapted to be positioned in laterally-spaced substantially parallel relationship on opposite sides of the area to be machined with an open space between said supports to give access to the area to be machined, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a cross beam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, and mechanism for moving said slides independently of one another horizontally along their respective supports.

2. A portable milling machine comprising a pair of substantially horizontal separate elongated supports adapted to be positioned in laterally-spaced substantially parallel relationship on opposite sides of the area to be machined with an open space between said supports to give access to the area, said supports also being independently movable relatively to one another, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a cross beam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, and mechanism for moving said slides independently of one another horizontally along their respective supports.

3. A portable milling machine comprising a pair of substantially horizontal separate elongated supports adapted to be positioned in laterally-spaced substantially parallel relationship on opposite sides of the area to be machined with an open space between said supports to give access to the area to be machined, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a cross beam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, and mechanism drivingly connected to said prime mover for moving said slides along their respective supports.

4. A portable milling machine comprising a pair of substantially horizontal separate elongated supports adapted to be positioned in laterally-spaced substantially parallel relationship on opposite sides of the area to be machined with an open space between said supports to give access to the area to be machined, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a cross beam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, and mechanism drivingly connected to said prime mover for moving said slides independently of and relatively to one another horizontally along their respective supports.

5. A portable milling machine comprising a pair of substantially horizontal separate elongated supports adapted to be positioned in laterally-spaced substantially parallel relationship on opposite sides of the area to be machined with an open space between said supports to receive the article to be machined, a slide mounted for horizontal travel along each support, a bracket housing mounted on and traveling horizontally with one of said slides, a driving mechanism housing mounted on and traveling horizontally with the other of said slides, a cross beam extending between said housings and traveling horizontally therewith, said cross beam loosely and slidably engaging one of said housings, a carriage slidably mounted on said cross beam, a cutter head mounted on said carriage, a cutter spindle rotatably mounted on said cutter head, a prime mover, mechanism drivingly connecting said cutter spindle to said prime mover, said connecting mechanism being disposed at least partially within said driving mechanism housing, and mechanism for moving said carriage horizontally along said cross beam, said carriage having cutter head mounting portions on opposite sides thereof and said cutter head being selectively and interchangeably attachable to either of said mounting portions.

6. A portable milling machine comprising a pair of substantially horizontal separate elongated supports adapted to be positioned in laterally-spaced substantially parallel relationship on opposite sides of the area to be machined with an open space between said supports to receive the article to be machined, a slide mounted for horizontal travel along each support, a bracket housing mounted on and traveling horizontally with one of said slides, a driving mechanism housing mounted on and traveling horizontally with the other of said slides, a cross beam extending between said housings and traveling horizontally therewith, said cross beam loosely and slidably engaging one of said housings, a carriage slidably mounted on said cross beam, a cutter head mounted on said carriage, a cutter spindle rotatably mounted on said cutter head, a prime mover, mechanism drivingly connecting said cutter spindle to said prime mover, said connecting mechanism being disposed at least partially within said driving mechanism housing, and mechanism for moving said carriage horizontally along said cross beam, said carriage having vertically-directed guideways on opposite sides thereof and said cutter head being selectively and slidably mountable on either of said guideways.

7. A portable milling machine comprising a pair of substantially horizontal separate elongated supports adapted to be positioned in laterally-spaced substantially parallel relationship on opposite sides of the area to be machined with an open space between said supports to give access to the area to be machined, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a cross beam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, mechanism for moving said slides independently of one another horizontally along their respective supports, and speed reduction gearing in said driving mechanism housing drivingly interconnecting said prime mover and said mechanisms.

8. A portable milling machine comprising a pair of substantially horizontal separate elongated supports adapted to be positioned in laterally-spaced substantially parallel relationship on opposite sides of the area to be machined with an open space between said supports to give access to the area to be machined, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a cross beam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, mechanism for moving said slides independently of one another horizontally along their respective supports, and speed reduction and reverse gearing in said driving mechanism housing drivingly interconnecting said prime mover and said mechanisms.

9. A portable milling machine comprising a pair of substantially horizontal separate elongated supports adapted to be positioned in laterally-spaced substantially parallel relationship on opposite sides of the area to be machined with an open space between said supports to give access to the area to be machined, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a cross beam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, mechanism drivingly connected to said prime mover for moving said slides along their respective supports, and speed reduction gearing in said driving mechanism housing drivingly interconnecting said prime mover and said mechanisms.

10. A portable milling machine comprising a pair of substantially horizontal separate elongated supports adapted to be positioned in laterally-spaced substantially parallel relationship on opposite sides of the area to be machined with an open space between said supports to give access to the area to be machined, a slide mounted for horizontal travel along each support, a bracket housing mounted on and traveling horizontally with one of said slides, a driving mechanism housing mounted on and traveling horizontally with the other of said slides, said slides being mounted on their supports for travel independently of and relatively to one another, both of said housings being pivotally mounted on their respective slides, a crossbeam extending between said housings and traveling horizontally therewith, said cross beam having horizontal longitudinal sliding engagement with one of said housings, a carriage horizontally slidably mounted on said cross beam, a cutter spindle rotatably mounted on said carriage, a prime mover, mechanism drivingly connecting said cutter spindle to said prime mover, said connecting mechanism being disposed at least partially within said driving mechanism housing, mechanism for moving said carriage horizontally along said cross beam, mechanism drivingly connected to said prime mover for moving said slides along their respective supports, and speed reduction and reverse gearing in said driving mechanism housing drivingly interconnecting said prime mover and said mechanisms.

HENRY EARL MORTON.

References Cited in the file of this patent

UNITED STATES PATENTS

| Number | Name | Date |
| --- | --- | --- |
| 808,563 | Moore | Dec. 26, 1905 |
| 2,245,558 | Johnson | June 17, 1941 |
| 2,405,856 | Schaerer | Aug. 13, 1946 |
| 2,419,868 | Yeomans et al. | Apr. 29, 1947 |
| 2,434,751 | Trecker et al. | Jan. 20, 1948 |
| 2,456,041 | Barker | Dec. 14, 1948 |

FOREIGN PATENTS

| Number | Country | Date |
| --- | --- | --- |
| 1,571 | Great Britain | June 9, 1865 |
| 257,202 | Germany | of 1913 |
| 495,866 | France | of 1919 |
| 519,102 | Great Britain | Mar. 15, 1940 |